(12) United States Patent
Cordeiro et al.

(10) Patent No.: US 12,523,892 B2
(45) Date of Patent: Jan. 13, 2026

(54) METHODS AND SYSTEMS FOR THERMAL CONTROL OF AN OPTICAL SOURCE OR OPTICAL FILTER IN A LIGHT DETECTION AND RANGING (LIDAR) APPARATUS

(71) Applicant: Sense Photonics, Inc., Durham, NC (US)

(72) Inventors: Christine Elizabeth Cordeiro, San Francisco, CA (US); Hod Finkelstein, Berkeley, CA (US); Jamie Stokes, Linlithgow (GB); Neil Telfer, Edinburgh (GB)

(73) Assignee: Sense Photonics, Inc., Durham, NC (US)

( * ) Notice: Subject to any disclaimer, the term of this patent is extended or adjusted under 35 U.S.C. 154(b) by 1197 days.

(21) Appl. No.: 17/168,807

(22) Filed: Feb. 5, 2021

(65) Prior Publication Data
US 2021/0181547 A1    Jun. 17, 2021

Related U.S. Application Data

(63) Continuation-in-part of application No. 16/273,783, filed on Feb. 12, 2019, now Pat. No. 11,467,286.
(Continued)

(51) Int. Cl.
*G01S 7/00* (2006.01)
*G01S 7/481* (2006.01)
*G02F 1/01* (2006.01)

(52) U.S. Cl.
CPC ............ *G02F 1/0147* (2013.01); *G01S 7/481* (2013.01); *G02F 1/0121* (2013.01); *G02F 2201/58* (2013.01)

(58) Field of Classification Search
USPC ........................................... 356/4.01
See application file for complete search history.

(56) References Cited

U.S. PATENT DOCUMENTS 5,565,982 A * 10/1996 Lee .................... G01J 3/453
                                                      250/459.1
9,831,630 B2 * 11/2017 Lipson ................ G01S 7/4815
(Continued)

FOREIGN PATENT DOCUMENTS

JP    2010091378 A    4/2010
JP    2013092385 A    5/2013
(Continued)

OTHER PUBLICATIONS

Extended European Search Report corresponding to EP 19848671.4 mailed Jul. 27, 2021 (8 pages).
(Continued)

*Primary Examiner* — James R Hulka
(74) *Attorney, Agent, or Firm* — Kilpatrick Townsend & Stockton LLP

(57) ABSTRACT

A Light Detection And Ranging (LIDAR) apparatus includes an optical emission source configured to emit an optical signal having a wavelength that varies based on a temperature of the optical emission source and/or an optical filter element that is configured to receive a reflection of the optical signal, the optical filter element having a passband that varies based on a temperature of the optical filter element; a thermal controller that is configured to generate a thermal control signal responsive to a temperature measurement related to the optical emission source or the optical filter element; and a temperature control element that is configured to adjust a temperature of the optical emission source or the optical filter element responsive to the thermal control signal.

18 Claims, 7 Drawing Sheets

Related U.S. Application Data

(60) Provisional application No. 62/970,214, filed on Feb. 5, 2020.

(56) References Cited

U.S. PATENT DOCUMENTS

| | | | | |
|---|---|---|---|---|
| 10,036,803 | B2* | 7/2018 | Pacala | G01S 17/42 |
| 10,298,908 | B2* | 5/2019 | Retterath | G01S 17/894 |
| 10,359,375 | B2* | 7/2019 | Cao | A61B 6/502 |
| 10,802,221 | B1 | 10/2020 | Murano et al. | |
| 10,895,534 | B2* | 1/2021 | Finkelstein | G01S 7/4863 |
| 11,006,876 | B2* | 5/2021 | Johnson | A61B 5/742 |
| 11,096,620 | B1* | 8/2021 | Seidman | A61B 5/4064 |
| 11,187,575 | B2* | 11/2021 | Field | G01J 1/0238 |
| 2006/0074281 | A1* | 4/2006 | Hwang | A61B 5/1455 600/310 |
| 2008/0161987 | A1* | 7/2008 | Breed | G08G 1/161 701/27 |
| 2009/0010435 | A1* | 1/2009 | Zbinden | H04B 10/70 380/256 |
| 2010/0183307 | A1* | 7/2010 | Matsumoto | H04B 10/506 398/79 |
| 2010/0277714 | A1* | 11/2010 | Pedersen | G01S 7/497 356/28 |
| 2012/0274937 | A1* | 11/2012 | Hays | G01S 17/95 356/450 |
| 2012/0294321 | A1* | 11/2012 | Ma | H01S 5/141 372/20 |
| 2014/0158870 | A1 | 6/2014 | Deantonio et al. | |
| 2015/0103851 | A1* | 4/2015 | Ma | G02B 5/288 372/20 |
| 2015/0104199 | A1* | 4/2015 | Ye | H04B 10/40 359/288 |
| 2016/0261085 | A1* | 9/2016 | Xu | H01S 3/137 |
| 2016/0282177 | A1 | 9/2016 | Heinonen | |
| 2017/0191107 | A1* | 7/2017 | Martini | C12Q 1/10 |
| 2017/0299700 | A1* | 10/2017 | Pacala | G01S 17/10 |
| 2017/0299900 | A1* | 10/2017 | Montoya | G02F 1/0121 |
| 2017/0307736 | A1* | 10/2017 | Donovan | G01S 7/484 |
| 2018/0295344 | A1* | 10/2018 | Retterath | H04N 13/271 |
| 2019/0221988 | A1* | 7/2019 | Villeneuve | G01S 7/4865 |
| 2019/0250257 | A1 | 8/2019 | Finkelstein et al. | |
| 2019/0310375 | A1* | 10/2019 | Finkelstein | G01S 7/4868 |
| 2020/0057151 | A1* | 2/2020 | Finkelstein | G01S 7/4876 |
| 2020/0135776 | A1* | 4/2020 | Finkelstein | H01L 31/0232 |
| 2020/0158836 | A1* | 5/2020 | Henderson | G04F 10/005 |
| 2020/0158838 | A1* | 5/2020 | Henderson | G01S 7/4815 |
| 2020/0196932 | A1* | 6/2020 | Johnson | A61B 5/7455 |
| 2020/0217965 | A1* | 7/2020 | Calder | G01S 7/4863 |
| 2020/0284884 | A1* | 9/2020 | Henderson | H04N 25/773 |
| 2021/0109224 | A1* | 4/2021 | Finkelstein | G01S 17/894 |
| 2021/0231782 | A1* | 7/2021 | Henderson | G01S 7/4915 |
| 2021/0259618 | A1* | 8/2021 | Seidman | G01N 33/4833 |
| 2021/0293614 | A1* | 9/2021 | Field | G01J 1/0238 |

FOREIGN PATENT DOCUMENTS

| | | |
|---|---|---|
| WO | 2010149593 A1 | 12/2010 |
| WO | 2017143217 A1 | 8/2017 |
| WO | 2020118017 A1 | 6/2020 |

OTHER PUBLICATIONS

European Office Action corresponding to European Application No. 19848671.4 (6 pages) (May 31, 2023).

* cited by examiner

FIG. 4A

| Optical Source 205 | Temperature Control Element 240 |

FIG. 4B

| Optical Source 205 | Thermal Coupling Member 305 | Temperature Control Element 240 |

FIG. 4C

| Optical Filter 220 | Temperature Control Element 245 |

FIG. 4D

| Optical Filter 220 | Thermal Coupling Member 310 | Temperature Control Element 245 |

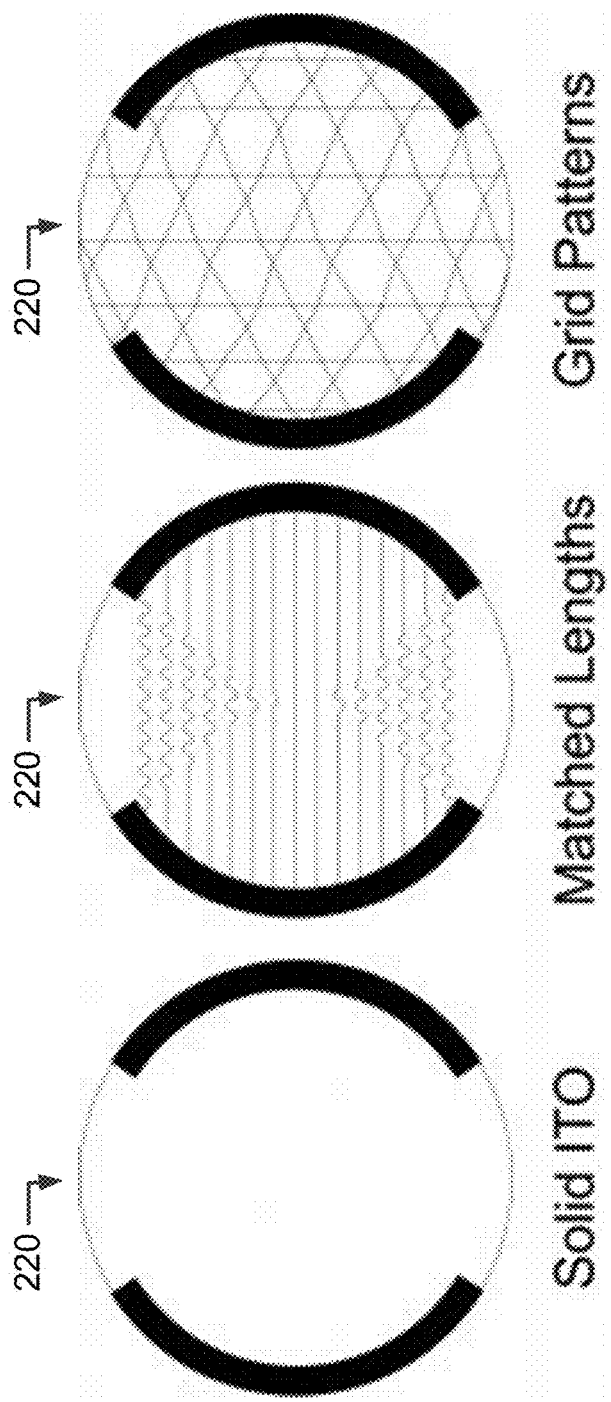

METHODS AND SYSTEMS FOR THERMAL CONTROL OF AN OPTICAL SOURCE OR OPTICAL FILTER IN A LIGHT DETECTION AND RANGING (LIDAR) APPARATUS

CROSS-REFERENCE TO RELATED APPLICATIONS

This application is a continuation-in-part of U.S. patent application Ser. No. 16/273,783 filed on Feb. 12, 2019 and further claims the benefit of priority from U.S. Provisional Patent Application No. 62/970,214 entitled "Filter Thermal Controller for Flash LIDAR" filed on Feb. 5, 2020, in the United States Patent and Trademark Office, the disclosures of which are incorporated by reference herein.

FIELD

The subject matter herein relates generally to image sensors, and more specifically to image sensors for imaging in LIght Detection And Ranging (LIDAR) systems.

BACKGROUND

In a LIDAR system, or any system with an optical light source, which may be referred to as an emitter or emission source, and a detector, which may be referred to or included in a receiver, noise rejection may be required to get sufficiently high signal to noise ratio to achieve performance objectives. In the case of a LIDAR system, an optical filter element may be used to reject background light from the sun and other sources, generally referred to as "background noise" or "background." FIG. 1 is a block diagram of a LIDAR apparatus 100, which includes an optical source 100 that is configured to emit an optical signal, which is shown in FIG. 1 as emitted light. The optical signal may reflect off an object 110, which may then be sensed in a receiving portion of the LIDAR apparatus 100. The receiving portion of the LIDAR apparatus 100 includes a lens 115, an optical filter 120, and a detector 125. As shown in FIG. 1, the reflected optical signal from the object 110 may combine with background light, such as sunlight, which has the effect of adding noise to the reflected optical signal. The lens 115 and optical filter 120, which may be combined in a single device or apparatus, receives the reflected optical signal and the background light and are configured to improve the signal to noise ratio of the optical signal provided to the detector 125 by filtering the background light. The linewidth of the optical filter 125 may be chosen to pass or transmit light of a wavelength range that doesn't cut off the wavelengths of the light emitted by the optical source 105, but rejects or prevents transmission to the detector 125 as much as possible of the received background noise, which typically has a broad spectrum that overlaps the emitter wavelengths.

One challenge with this design of the LIDAR apparatus 100 is that the wavelengths of some emission sources, such as VCSELs, other types of lasers or LEDs, and the passband of some optical filters, such as those implemented as dielectric-stack interference filters or absorbing filters, may drift over changes in temperature, in many instances at different rates. For example, a lidar system may be required to operate between −40° C. and 85° C. The optical source may have a temperature coefficient of 0.07 nm/° C. and may have a nominal wavelength of 900 nm at 25 C with 0.5 nm FWHM linewidth. The filter may have a center transmission wavelength of 900 nm, a transmission width of 6 nm and a temperature coefficient of 0.01 nm/C. At −40° C. the emitted light center wavelength is 900−65×0.07=895.45 nm but the filter pass band is centered on 900−65×0.01=899.35, i.e., 896.35-902.35 nm. Therefore, the optical filter may reject the signal and the lidar system may not accurately detect light from the emission source. The emission and filter transmission wavelengths as a function of temperature are shown in the graph of FIG. 2. As shown in FIG. 2, the temperature coefficient of the optical source and the temperature coefficient of the optical filter may have the same sign. That is, changes in the wavelength of the emitted light from the optical source and changes in the passband of the optical filter are positively correlated.

As described above, the temperature of the optical source 105 and the optical filter 120 may not be matched at a given moment. The way in which the filter passband and source emission wavelengths change with temperature may not match (i.e., the filter passband and emission wavelengths may change at different rates with changes in temperature of the operating environment), and the temperatures of the optical source 105 and the optical filter 120 may also differ, especially if they are not in contact with each other. This may lead to a scenario where the emission spectrum and the filter transmission spectra do not overlap and, thus, the reflected optical signal may be lost. Alternatively, to prevent such a scenario, the filter bandwidth may be selected to be wide enough to accommodate the drift in wavelength over temperature, and, thus more of the received background light is also transmitted to the detector 125 thus reducing the signal to noise ratio (SNR). As another alternative, the optical source 105 and the receiver components, such as the lens 115, optical filter 120, and detector 125, may be inserted in a temperature-controlled enclosure. In some cases, such as with flash LIDAR systems, the optical source 105 may be relatively large and output relatively high power, so keeping the emitter at a substantially constant temperature (regardless or independent of the ambient temperature and/or the optical source 105 power output) may result in a large, expensive and power-hungry system. Some other conventional operations for addressing wavelength drift with temperature include stably controlling the temperature to tune the wavelength of the optical filter 120 in an open loop, non-dynamic implementation.

SUMMARY

In some embodiments of the inventive concept, a Light Detection And Ranging (LIDAR) apparatus comprises: an optical emission source configured to emit an optical signal having a wavelength that varies based on a temperature of the optical emission source and/or an optical filter element that is configured to receive a reflection of the optical signal, the optical filter element having a passband that varies based on a temperature of the optical filter element; a thermal controller that is configured to generate a thermal control signal responsive to a temperature measurement related to the optical emission source or the optical filter element; and a temperature control element that is configured to adjust a temperature of the optical emission source or the optical filter element responsive to the thermal control signal.

In other embodiments, the temperature control element is a heater element or a heat sink.

In still other embodiments, the temperature control element is configured to adjust the temperature of the optical filter element, the temperature measurement is related to the optical emission source, and the temperature control element is a heater element. The heater element comprises a transparent conductive oxide or nichrome.

In still other embodiments, the heater element is coated onto the optical filter element.

In still other embodiments, the heater element comprises wires carried on the optical filter element.

In still other embodiments, the transparent conductive oxide comprises indium tin oxide.

In still other embodiments, the heater element directly contacts the optical filter element.

In still other embodiments, the temperature control element is configured to adjust the temperature of the optical filter element, the temperature measurement is related to the optical emission source, and the temperature control element is a heater element. The LIDAR apparatus further comprises a thermal coupling member that is configured to connect the heater element to the optical filter element.

In still other embodiments, the temperature control element is configured to adjust the temperature of the optical filter element, the temperature measurement is related to the optical emission source, and the temperature control element is a heater element. The heater element is positioned in the Fourier plane with respect to the optical filter element.

In still other embodiments, the temperature control element is configured to adjust the temperature of the optical filter element, the temperature measurement is related to the optical emission source, and the temperature control element is a heater element. The LIDAR apparatus further comprises an optical lens configured to receive a filtered reflection of the optical signal output from the optical filter element. The optical lens comprises the optical filter element and the heater element is on a barrel of the optical lens.

In still other embodiments, the temperature control element is configured to adjust the temperature of the optical filter element, the temperature measurement is related to the optical emission source, and the temperature control element is a heater element. The LIDAR apparatus further comprises a monitor circuit that is configured to generate a temperature stabilization detection signal when the temperature of the optical emission source has stabilized. The heater element is further configured to adjust a temperature of the optical emission source or the optical filter element responsive to the thermal control signal and the temperature stabilization detection signal.

In still other embodiments, the temperature control element is configured to adjust the temperature of the optical filter element. The temperature control element is a heater element or a heat sink.

In still other embodiments, the temperature control element is configured to adjust the temperature of the optical emission source. The temperature control element is a heater element or a heat sink.

In still other embodiments, the temperature control element is a first temperature control element that is configured to adjust the temperature of the optical filter element. The LIDAR apparatus further comprises a second temperature control element that is configured to adjust the temperature of the optical emission source responsive to the thermal control signal. The first temperature control element is a first heater element and the second temperature control element is a first heat sink or the first temperature control element is a second heat sink and the second temperature control element is a second heater element.

In still other embodiments, the LIDAR apparatus further comprises an optical lens configured to receive a filtered reflection of the optical signal output from the optical filter element. The optical lens and the optical filter element are substantially vacated of humidity.

In still other embodiments, a first temperature coefficient of the optical emission source and a second temperature coefficient of the optical filter element have a same sign.

In some embodiments of the inventive concept, a LIDAR apparatus comprises: an optical emission source configured to emit an optical signal having a wavelength that varies based on a temperature of the optical emission source and/or an optical filter element that is configured to receive a reflection of the optical signal, the optical filter element having a passband that varies based on a temperature of the optical filter element; and a thermal coupling member that is configured to connect the optical emission source to the optical filter element.

In further embodiments, the thermal coupling member comprises diamond, silver, copper, gold, aluminum nitride, silicon carbide, aluminum, tungsten, graphite, or zinc.

In still further embodiments, a first temperature coefficient of the optical emission source and a second temperature coefficient of the optical filter element have a same sign.

In some embodiments of the inventive concept, a LIDAR apparatus comprises: an optical emission source configured to emit an optical signal having a wavelength that varies based on a temperature of the optical emission source and/or an optical filter element that is configured to receive a reflection of the optical signal, the optical filter element having a passband that varies based on a temperature of the optical filter element; an optical signal analyzer that is configured to determine a characteristic of the optical signal emitted by the optical emission source or a characteristic of the reflection of the optical signal and to generate a thermal control signal based on the characteristic of the optical signal or the characteristic of the reflection of the optical signal; and a temperature control element that is configured to adjust a temperature of the optical emission source or the optical filter element responsive to the thermal control signal.

In other embodiments, the characteristic of the reflection of the optical signal is a signal strength of the optical signal.

In still other embodiments, the characteristic of the optical signal is a wavelength range of the optical signal.

In some embodiments of the inventive concept, a method of operating a LIDAR apparatus comprises: emitting using an optical emission source an optical signal having a wavelength that varies based on a temperature of the optical emission source and/or receiving using an optical filter element a reflection of the optical signal, the optical filter element having a passband that varies based on a temperature of the optical filter element; generating using a thermal controller a thermal control signal responsive to a temperature measurement related to the optical emission source or the optical filter element; and adjusting using a temperature control element a temperature of the optical emission source or the optical filter element responsive to the thermal control signal.

In further embodiments, the temperature control element is a heater element or a heat sink.

In still further embodiments, adjusting using the temperature control element the temperature of the optical emission source or the optical filter element comprises adjusting using the temperature control element the temperature of the optical filter element. The temperature control element is a heater element or a heat sink.

In still further embodiments, adjusting using the temperature control element the temperature of the optical emission source or the optical filter element comprises adjusting using the temperature control element the temperature of the optical emission source. The temperature control element is a heater element or a heat sink.

Other methods, systems or apparatus, according to embodiments of the inventive concept, will be or become apparent to one with skill in the art upon review of the following drawings and detailed description. It is intended that all such additional systems, methods, articles of manufacture, and/or computer program products be included within this description, be within the scope of the present inventive concept, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which:

FIGS. 4A, 4B, 4C, and 4D are block diagrams that illustrate relationships between temperature control elements and an optical source and optical filter according to some embodiments of the inventive concept;

FIGS. 5A, 5B, and 5C illustrate the temperature control element implemented as a heater element on an optical filter in accordance with various embodiments of the inventive concept;

DETAILED DESCRIPTION

Figure 1:
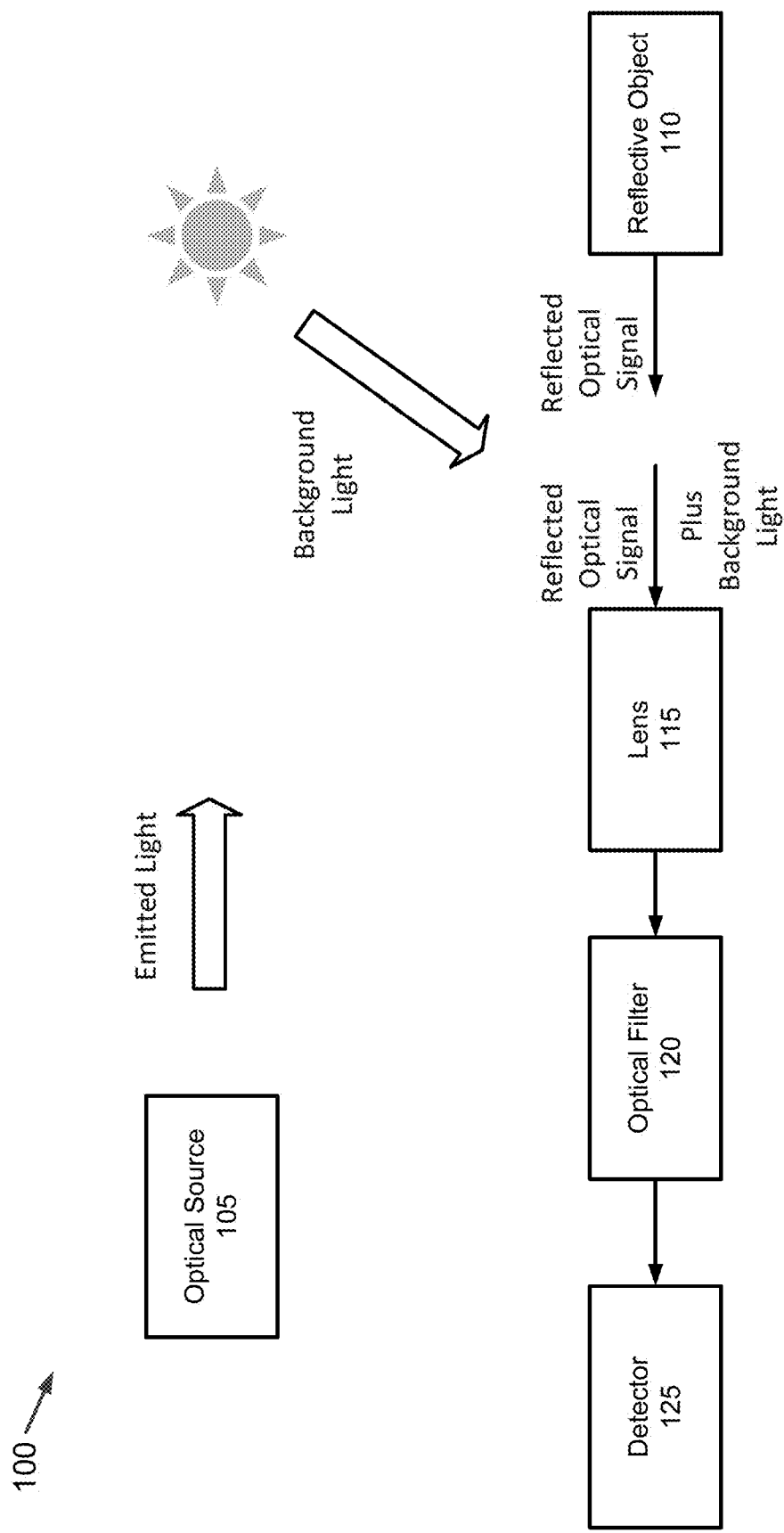
FIG. 1 is a block diagram of a conventional Light Detection And Ranging (LIDAR) apparatus.
Figure 2:
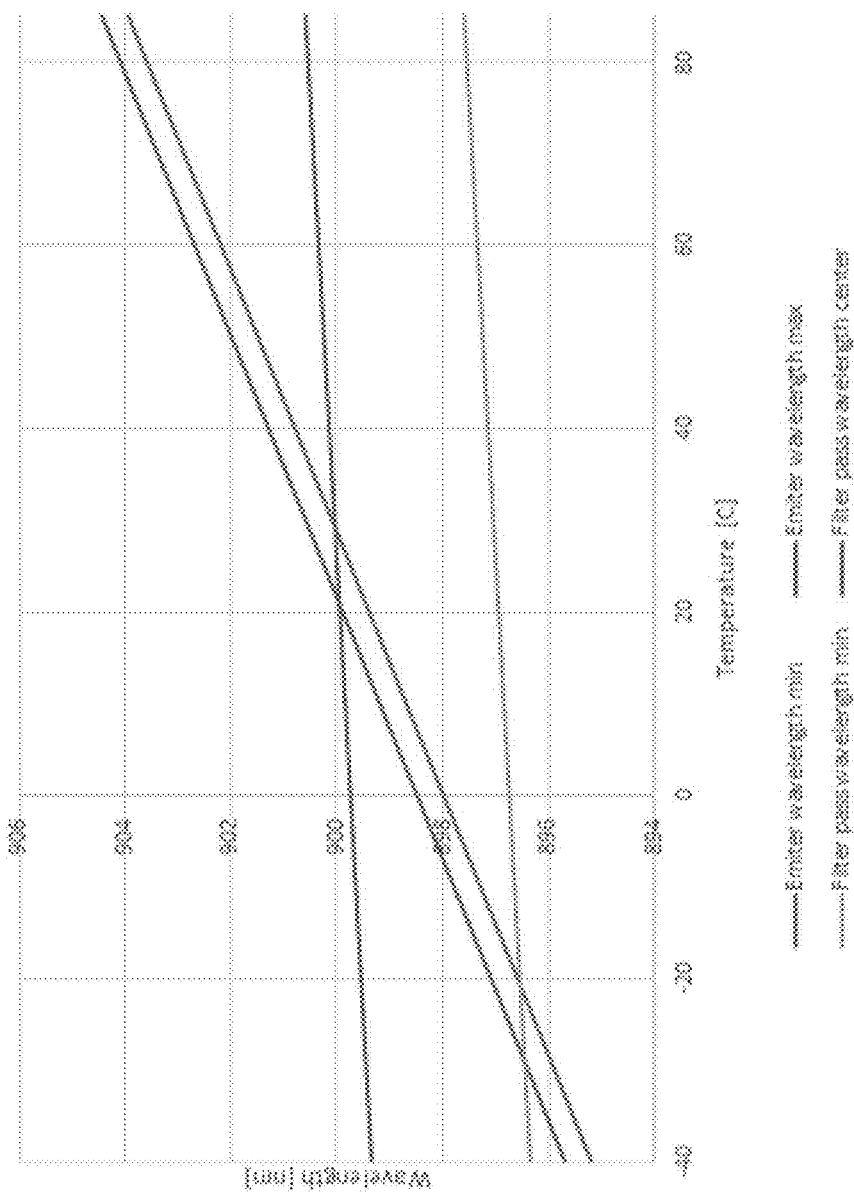
FIG. 2 is a diagram that illustrates a positive correlation between an optical emission source wavelength and an optical filter passband in response to temperature variation according to some embodiments of the inventive concept.

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Some embodiments of the inventive concept are directed to Light Detection And Ranging (LIDAR) apparatus and methods of operating the same in which various techniques are used to adjust the temperature of an optical source and/or an optical filter to ensure that light emission bands and the filter passbands overlap sufficiently to exclude background light or noise and to pass the reflected optical on to a detector. In accordance with various embodiments of the inventive concept, a thermal controller may receive a temperature measurement associated with an optical source and/or an optical filter and use that temperature measurement or those temperature measurements to operate one or more temperature control elements to adjust the temperatures of the optical source, optical filter, or both the optical source and optical filter. The temperature control element may be a heater element or a heat sink for heating or cooling, respectively, the optical source or optical filter. Some embodiments of the inventive concept may make use of an optical signal analyzer that is configured to determine a characteristic of the optical signal emitted by the optical source or a characteristic of a reflected optical signal output from the optical filter. The characteristic of the optical signal emitted by the optical source may be a wavelength range of the optical signal and a characteristic of the reflected optical signal output from the optical filter may be a signal strength of the reflected optical signal output from the optical filter. Embodiments of the present inventive concept may allow higher noise rejection by using an optical filter having relatively narrow passband (e.g., sufficient to substantially reject background that is outside the wavelengths of the light output from the emission source) and controlling the temperature of the optical source and/or optical filter (e.g., by transmitting control signals from a thermal controller to one or more temperature control elements coupled to the optical source and/or filter, respectively) so that the optical filter accepts the emitter wavelength under various operating conditions and ambient temperature ranges. Embodiments of the present inventive concept may also allow the optical source and optical receiver to be housed in separate enclosures or boxes that are not thermally coupled to one another. Embodiments of the present inventive concept may allow systems with an optical source and detector, such as LIDAR systems, to have higher SNR and improved performance. In particular, in LIDAR applications, embodiments of the present inventive concept may allow a LIDAR system to determine the distance ranges of objects that are dimmer and/or farther away from the LIDAR system.

Although embodiments of the inventive concept are described herein primarily with reference to the temperature control element as a heater element or a heat sink, it will be understood that embodiments of the present inventive concept are not limited to such implementations and may more generally include transferring heat to or from the optical filter and/or to or from the emission source using, for example, thermoelectric elements.

Figure 3:
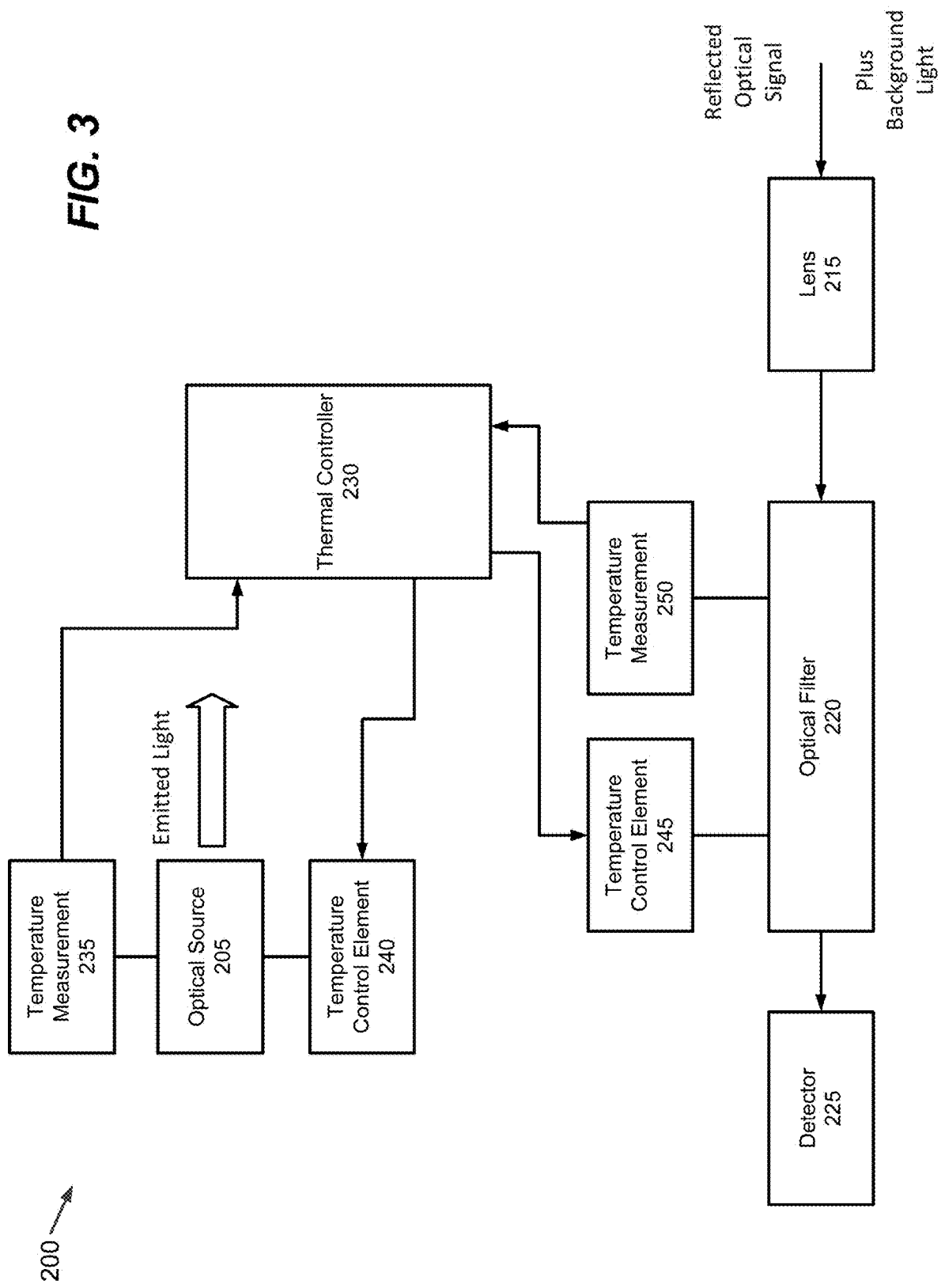
FIG. 3 is a block diagram of a LIDAR apparatus including a thermal controller in accordance with some embodiments of the inventive concept.

FIG. 3 is a block diagram of a LIDAR apparatus 200 according to some embodiments of the inventive concept. The LIDAR apparatus 200 includes an optical source 205, which may be referred to as an optical emission source or emitter, and which is configured to emit an optical signal shown as emitted light in FIG. 3. The optical signal may reflect off an object and this reflected optical signal may be sensed in the receiving portion of the LIDAR apparatus 100. As described above, the reflected optical signal may be accompanied by "noise" in the form of background light, such as that generated by the sun or other light sources. The receiving portion of the LIDAR apparatus 200 includes a lens 215, an optical filter 220, and a detector 225. The lens 215 is configured to receive the reflected optical signal plus the background light and the optical filter 220 may be configured to improve the signal to noise ratio of the received signal by filtering the background light while passing the reflected optical signal to the detector 225. The lens 215 and the optical filter 220 may be combined in a single device or may be embodied as separate components that are optically coupled to one another. In some embodiments of the inventive concept, the optical filter 220 and the lens 215 may be substantially vacated of humidity to reduce condensation in these components. The detector 225 may include an array of photodetectors, including single-photon detectors, such as a Single Photon Avalanche Diode (SPAD) array. One or more photodetectors may define a detector pixel of the array. SPAD arrays may be used as solid-state photodetectors in imaging applications that may require high sensitivity and timing resolution.

As described above, the changes in temperature may cause variations in the wavelength of the optical signal emitted by the optical source 205 and may also cause variations in the passband of the optical filter 220. The LIDAR apparatus may further include a thermal controller 230, which may, for example, be a programmable microcontroller including a processor and memory for storing a control program for execution by the processor and data used by the control program. The thermal controller 230 may, in some embodiments, receive temperature measurements corresponding to a temperature of the optical source 205 and/or a temperature of the optical filter 220 by way of a temperature measurement module 235 and/or a temperature module 250, respectively. The temperature values read by the temperature measurement modules 235 and 250 may be the temperatures of the actual optical source 205 and actual optical filter 220, respectively, or may be temperatures measured in close proximity to the optical source 205 and the optical filter 220, respectively. The temperature measurement modules 235 and 250 may be further configured to measure ambient temperatures of or in close proximity to the optical source 205 and the optical filter 220, respectively. The thermal controller 230 may include calibration information, such as a calibration table, which represents the relationship between the mean light emission wavelength as a function of the temperature values read by the temperature measurement module 235 (which may or may not be the same as the temperature of the actual optical source 205) and/or the relationship between the optical filter 220 passband and the temperature values read by the temperature measurement module 250 (which may or may not be the same as the temperature of the actual optical filter 220). In some embodiments, the calibration information or calibration table may take into account both the current temperatures of the optical source 205 and/or optical filter 220 as well as ambient temperature of the optical source 205 and/or optical filter 220. The calibration information or calibration table may also relate the temperatures (ambient and/or current) of the optical source 205 and/or the optical filter 220 and/or the passband of the optical filter 220 with the voltage or current used in a heater element of the temperature control elements 240 and/or 245. In some embodiments, the temperature coefficient of the optical source 205 and the temperature coefficient of the optical filter 220 may have the same sign. That is, changes in the wavelength of the emitted light from the optical source 205 and changes in the passband of the optical filter 220 are positively correlated, i.e., they move in tandem in the same direction.

According to some embodiments of the inventive concept, the thermal controller 230 may use the relationship between temperature and light emission wavelength for the optical source 205 and/or the relationship between temperature and the passband for the optical filter 220 to control the temperature of the optical source 205 and/or the optical filter 220 by way of a temperature control element 240 and/or a temperature control element 245, respectively. Each of the temperature control element 240 and the temperature control element 245 may include a heater element and/or a heat sink, respectively, based on whether the thermal controller wants to heat or cool the optical source 205 and/or optical filter 220. Thus, the thermal controller may generate thermal control signals that are output to the temperature control elements 240 and/or 250 that can be used to operate heater elements and/or heat sinks to heat or cool either or both of the optical source 205 and the optical filter 220 to ensure that there is sufficient spectral overlap between the reflected optical signal received at the optical filter 220 and the passband of the optical filter 220. For example, as the temperature of the optical source 205 changes, for example, the temperature measurements reported to the thermal controller 230 by way of the temperature measurement module 235 may result in thermal control signals being output to the temperature control element 245 to adjust a heat setting of a heater element based to ensure that the temperature of the optical filter 220 results in the optical filter 220 having a passband that overlaps with the wavelength of the reflected optical signal.

FIGS. 4A, 4B, 4C, and 4D illustrate various embodiments of relationships between the temperature control elements 240 and 245 and the optical source 205 and the optical filter 220, respectively, according to some embodiments of the inventive concept. As shown in FIG. 4A, the optical source 205 and the temperature control element 240 may directly contact each other. In other embodiments shown in FIG. 4B, the optical source 205 and the temperature control element 240 may be coupled to one another by way of a thermal coupling member 305, which may be a metal or thermally conductive material, such as, but not limited to, diamond, silver, copper, gold, aluminum nitride, silicon carbide, aluminum, tungsten, graphite, and/or zinc. Similarly, as shown in FIG. 4C, the optical filter 220 and the temperature control element 245 may directly contact each other. In other embodiments shown in FIG. 4D, the optical filter 220 and the temperature control element 245 may be coupled to one another by way of a thermal coupling member 310, which may be a metal or thermally conductive material, such as, but not limited to, diamond, silver, copper, gold, aluminum nitride, silicon carbide, aluminum, tungsten, graphite, and/or zinc.

FIGS. 5A, 5B, and 5C illustrate various embodiments of the temperature control element 245 implemented as a heater element on the optical filter 220. In some embodiments, the heater element may be a transparent conductive oxide or nichrome layer or film that may be coated onto the optical filter 220. As shown in FIG. 5A, the transparent conductive oxide may be indium tin oxide that is coated onto the optical filter 220. In other embodiments, the heater element may include wires that are carried on the optical filter 220. As shown in FIG. 5B, the wires may be matched lengths or, as shown in FIG. 5C, the wires may be arranged in a grid pattern. Although described with respect to the optical filter 220, the heater element embodiments of FIGS. 5A through 5C may also be implemented on the optical source 205 in accordance with some embodiments of the inventive concept.

When the temperature control elements 240 and 245 are implemented as a heater element, the heater element may be configured to provide generally uniform heating across one or more surfaces of the optical source 205 and/or optical filter 220. In some embodiments, the temperature control element 240 may be positioned in the Fourier plane with respect to the optical filter element 220 to avoid interference with the reflected optical signal being received through the lens 115. In some embodiments in which the lens 215 and the optical filter 220 are formed as a single unit or component, the temperature control element 240 may be embodied as a heater element on a barrel of the lens 115. The lens 115 barrel may include vents for cooling.

Returning to FIG. 3, the thermal controller 230 may also be configured to implement a monitor circuit that is configured to generate a temperature stabilization detection signal when a temperature of the optical source 205 has stabilized based on temperature measurements from the temperature measurement module 235. The temperature control element 245 may be configured to adjust the temperature of the optical filter 220 in response to the thermal control signal and the temperature stabilization detection signal. In some embodiments, the monitor circuit may be implemented as a separate component from the thermal controller 230.

Figure 6:
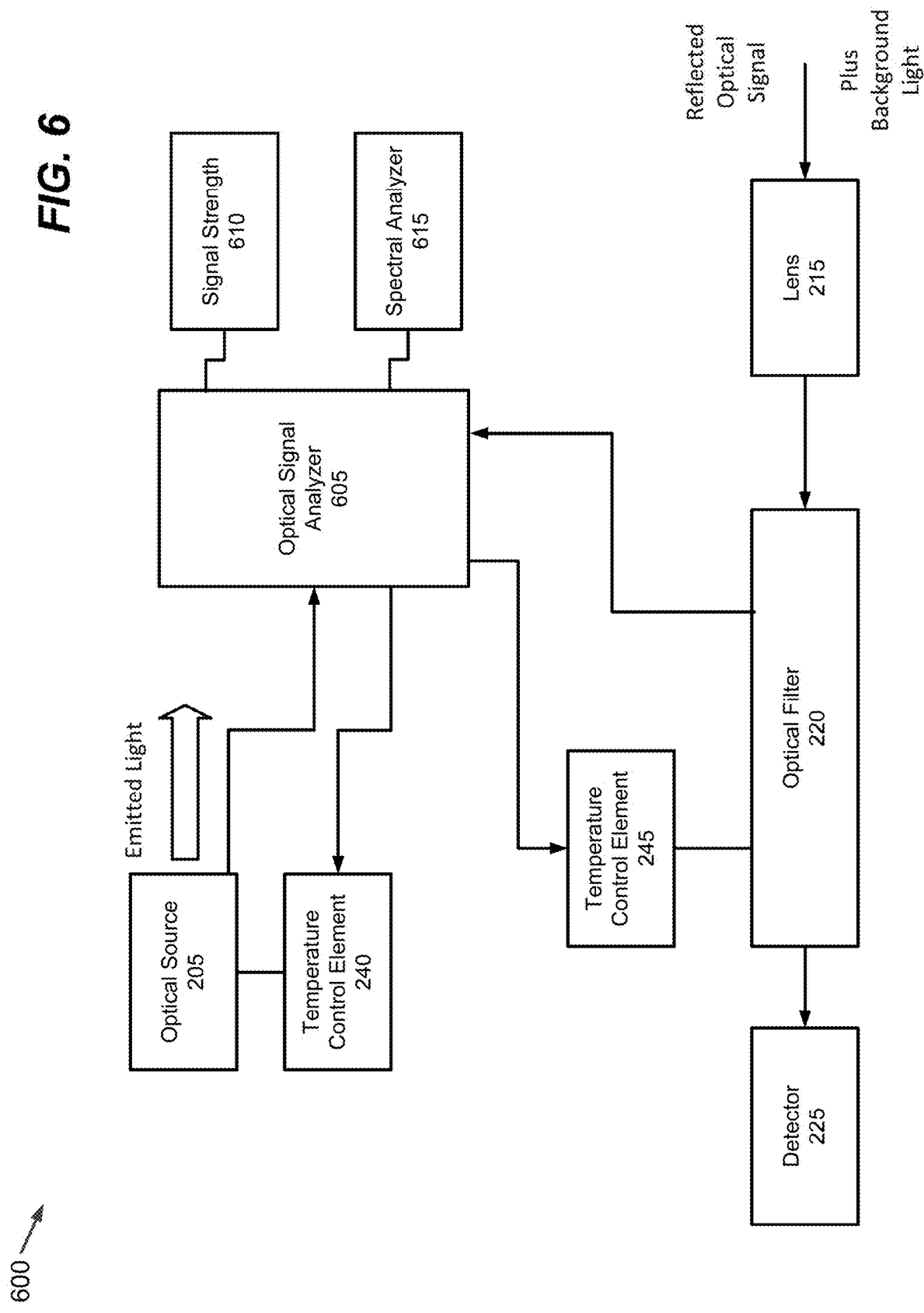
FIG. 6 is a block diagram of a LIDAR apparatus including an optical signal analyzer in accordance with some embodiments of the inventive concept.

Referring now to FIG. 6, a LIDAR apparatus 600 according to further embodiments of the inventive concept will be described. The LIDAR apparatus 600 includes similar optical transmission and reception branches as the LIDAR apparatus 200 of FIG. 3 including the temperature control elements 240 and 245. Rather than a thermal controller 230 of the LIDAR apparatus 200, however, the LIDAR apparatus 600 includes an optical signal analyzer 605. The optical signal analyzer 605 may be configured to determine a characteristic of the optical signal emitted by the optical source 205 and/or a characteristic of the reflected optical signal after being filtered by the optical filter 220. The characteristic of the reflected optical signal output by the optical filter 220 may be a signal strength and the reflected optical signal output by the optical filter 220 may be processed and analyzed by the signal strength module 610, which may be embodied as a photodetector. The optical signal analyzer 605 may be configured to adjust the temperature of the optical source 205 and/or the optical filter 220 by way of the temperature control elements 240 and/or 245, respectively, based on the signal strength of the reflected optical signal output from the optical filter 220 as determined by the signal strength module 610. Similarly, the characteristic of the optical signal emitted by the optical source 205 may be a wavelength range of the optical signal emitted by the optical source 205 and the optical signal emitted by the optical source 205 may be processed by a spectral analyzer module 615, which may be, for example, a spectrometer. The optical signal analyzer 605 may be configured to adjust the temperature of the optical source 205 and/or the optical filter 220 by way of the temperature control elements 240 and/or 245, respectively, based on the wavelength of the optical signal emitted by the optical source 205 as determined by the spectral analyzer module 615.

Figure 7:
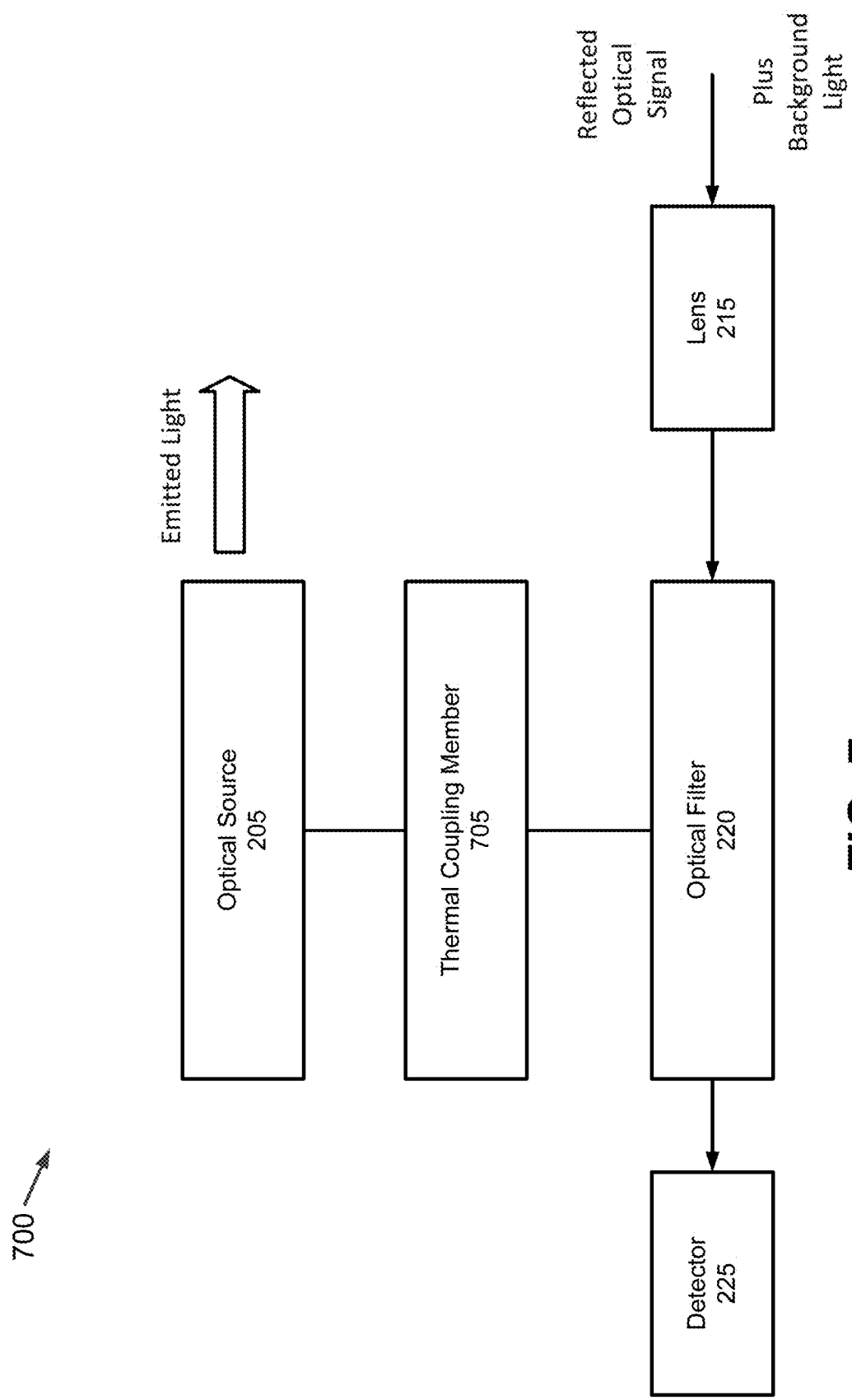
FIG. 7 is a block diagram of a LIDAR apparatus incorporating passive thermal coupling between an optical source and an optical filter in accordance with some embodiments of the inventive concept.

Referring now to FIG. 7, a LIDAR apparatus 700 according to further embodiments of the inventive concept will be described. The LIDAR apparatus 700 includes similar optical transmission and reception branches as the LIDAR apparatus 200 of FIG. 3. But rather than the thermal controller 230 of the LIDAR apparatus 200 or the optical signal analyzer 605 of the LIDAR apparatus 600, the LIDAR apparatus 700 makes use of passive thermal transfer of heat between the optical source 205 and the optical filter 220 to maintain similar temperatures between the two components. As shown in FIG. 7, the optical source 205 may be thermally coupled to the optical filter 220 using a thermal coupling member 705. In accordance with various embodiments of the inventive concept, the thermal coupling member may comprise a material such as, but not limited to, diamond, silver, copper, gold, aluminum nitride, silicon carbide, aluminum, tungsten, graphite, and/or zinc. The optical source 205 and the optical filter 220 may have temperature coefficients of the same sign, such that changes in the wavelength of the emitted light from the optical source 205 and changes in the passband of the optical filter 220 are positively correlated, i.e., they move in tandem in the same direction. As a result, by ensuring that any change in temperature of either the optical source 205 or the optical filter 220 is shared with the other component, the LIDAR apparatus 700 may provide sufficient overlap between the wavelength of the optical signal emitted by the optical source 205 and the passband of the optical filter 220.

Some embodiments of the inventive concept described herein may provide a LIDAR apparatus or system including an optical source, such as a single or array of VCSELs. The receiver may include one or more lenses, one or more optical filters, at least one of which can be temperature controlled using a temperature control element (e.g., a heating element or heater and/or a heat sink), a control circuit (e.g., a thermal controller), and a direct or indirect time of flight sensor or detector.

In some embodiments, the optical filter temperature control system or temperature control element includes a material (e.g., on or coating the filter) that is conductive across the filter and yet allows sufficient optical transmission of the optical signal wavelength. This can address the problem when the optical filter is made of materials that are poor thermal conductors, such that it may take longer to reach thermal equilibrium than desired across the whole optical filter aperture and the temperature across the optical filter may be non-uniform. These coatings may include indium tin oxide (ITO), Nichrome, or other coatings that are applied across the filter or in configurations such as thin crosswires or matched lengths of wires. These materials/coatings (or wires formed from these materials) can be applied directly on the filter or can be thermally coupled to the filter. In some embodiments of optical filter temperature control, the heater element is provided around the barrel of the lens. The lens barrel can include vents for cooling.

In some embodiments, the optical source or emitter can be cooled along with or instead of heating the optical filter. In other words, some embodiments include active control of temperatures of both the optical source and optical filter—but can be implemented by controlling the temperature of either of both. That is, embodiments of the present inventive concept are not limited to controlling the temperature of the filter based on the measured temperature of the optical source, but may additionally or alternatively include controlling the temperature of the optical source based on the measured temperature of the optical filter. In some embodiments, the filter and receiver optics are vacated of humidity so as to prevent condensation.

In some embodiments of the inventive concept, an optical signal analyzer may include a signal strength module, such as a photodetector, which may monitor the signal strength or the strength of a reference signal and may generate an output signal to the temperature control element associated with the optical filter and/or the optical source, for example, to increase or maximize the signal transmission (that is, transmission of light corresponding to the emission wavelengths). In some embodiments of the inventive concept, an optical signal analyzer may include a spectral analyzer, such as a spectrometer, which may measure the emission wavelength range or band of the output signal from the optical source or emitter and may generate an output signal to the temperature control element associated with the optical filter and/or with the optical source to match the transmission band of the optical filter to the emission band.

In some embodiments of the inventive concept, the temperature coefficient of both the optical source or emitter and receiver-optical filter have the same sign, i.e., they either both shift to the red (e.g., increase) as the temperature increases or they both shift to the blue (e.g., decrease) as the temperature increases, and vice versa when the temperature decreases. In some embodiments, the optical filter is designed and manufactured so that the filter only requires heating to match the optical source's wavelength across allowable operating conditions. In some embodiments, the optical filter is designed and manufactured so only cooling is required to match the optical source's wavelength across allowable operating conditions.

In some embodiments of the inventive concept, a monitor circuit may be configured to detect the time when the optical source or emitter reaches a sufficiently stable temperature and only then sends a control signal for the temperature control elements associated with the optical source and/or the optical filter. In some embodiments of the inventive concept, the LIDAR apparatus or system generates a "ready" signal only upon determining that the emitter and filter have been matched, for example, responsive to temperature adjusting the optical source or emitter and/or optical filter in accordance with the embodiments described herein and determining that the emission wavelengths of the optical source or emitter correspond to the transmission band of the optical filter based on the temperature adjustments.

FURTHER DEFINITIONS AND EMBODIMENTS

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment", "one embodiment" and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts. The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items. Like reference numbers signify like elements throughout the description of the figures.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present inventive concepts.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation.

What is claimed is:

1. A Light Detection And Ranging (LIDAR) apparatus, comprising:
    an optical emission source configured to emit an optical signal having a wavelength that varies based on a temperature of the optical emission source into a field external to the LIDAR apparatus;
    an optical filter element configured to receive a reflection of the optical signal after being reflected from surfaces within the field, the optical filter element having a passband that varies based on a temperature of the optical filter element;

an emission source temperature sensor operatively coupled to measure an ambient temperature of or in close proximity to the optical emission source;

an optical filter temperature sensor operatively coupled to measure an ambient temperature of, or in close proximity to, the optical filter element, a thermal controller comprising a processor and a non-transitory computer-readable memory having: (i) emission source calibration information stored therein that represents a relationship between light emission wavelength of the optical emission source as a function of temperature values measured by the emission source temperature sensor, and (ii) optical filter calibration information representing a relationship between a passband of the optical filter as a function of temperature values measured by the optical filter temperature sensor, wherein the thermal controller is configured to generate a first thermal control signal responsive to the measured ambient temperature of the optical emission source and the stored emission source calibration information and a second thermal control signal responsive to the measured ambient temperature of the optical filter element and the stored optical filter calibration information;

an emission source temperature control element configured to adjust a temperature of the optical emission source responsive to the first thermal control signal; and an optical filter temperature control element configured to adjust a temperature of the optical filter element in response to the second thermal control signal.

2. The LIDAR apparatus of claim 1, wherein the emission source temperature control element is a heater element or a heat sink.

3. The LIDAR apparatus of claim 1, wherein the optical filter temperature control element is a heater element; and
wherein the heater element comprises a transparent conductive oxide or nichrome.

4. The LIDAR apparatus of claim 3, wherein the heater element is coated onto the optical filter element.

5. The LIDAR apparatus of claim 3, wherein the heater element comprises wires carried on the optical filter element.

6. The LIDAR apparatus of claim 3, wherein the transparent conductive oxide comprises indium tin oxide.

7. The LIDAR apparatus of claim 3, wherein the heater element directly contacts the optical filter element.

8. The LIDAR apparatus of claim 1, wherein the optical filter temperature control element is a heater element; and
wherein the LIDAR apparatus further comprises:
a thermal coupling member that is configured to connect the heater element to the optical filter element.

9. The LIDAR apparatus of claim 1, wherein the optical filter temperature control element is a heater element; and
wherein the heater element is positioned in a Fourier plane with respect to the optical filter element.

10. The LIDAR apparatus of claim 1, wherein the optical filter temperature control element is a heater element; and
wherein the LIDAR apparatus further comprises:
an optical lens configured to receive a filtered reflection of the optical signal output from the optical filter element;
wherein the optical lens comprises the optical filter element and the heater element is on a barrel of the optical lens.

11. The LIDAR apparatus of claim 1, wherein the optical filter temperature control element is a heater element; and
wherein the LIDAR apparatus further comprises:
a monitor circuit that is configured to generate a temperature stabilization detection signal when the temperature of the optical emission source has stabilized; and
wherein the heater element is further configured to adjust a temperature of the optical filter element responsive to the second thermal control signal and the temperature stabilization detection signal.

12. The LIDAR apparatus of claim 1, wherein the optical filter temperature control element is
a heater element or a heat sink.

13. The LIDAR apparatus of claim 2, wherein the emission source temperature control element is configured to adjust the temperature of the optical emission source; and
wherein the temperature control element is a heater element or a heat sink.

14. The LIDAR apparatus of claim 1, further comprising;
an optical lens configured to receive a filtered reflection of the optical signal output from the optical filter element;
wherein the optical lens and the optical filter element are substantially vacated of humidity.

15. The LIDAR apparatus of claim 1, wherein a first temperature coefficient of the optical emission source and a second temperature coefficient of the optical filter element have a same sign.

16. A method of operating a Light Detection And Ranging (LIDAR) apparatus, comprising:
emitting, using an optical emission source, an optical signal having a wavelength that varies based on a temperature of the optical emission source into a field external to the LIDAR apparatus;
receiving, using an optical filter element, a reflection of the optical signal after being reflected from surfaces within the field, the optical filter element having a passband that varies based on a temperature of the optical filter element;
measuring an ambient temperature of, or in close proximity to, the optical emission source with an emission source temperature sensor;
measuring an ambient temperature of, or in close proximity to, the optical filter element with an optical filter temperature sensor;
storing, in a computer-readable memory: (i) emission source calibration information representing a relationship between light emission wavelength of the optical emission source as a function of temperature values measured by the emission source temperature sensor, and (ii) optical filter calibration information representing a relationship between a passband of the optical filter as a function of temperature values measured by the optical filter temperature sensor;
generating, using a thermal controller: (i) a first thermal control signal responsive to the measured ambient temperature of the optical emission source and the stored emission source calibration information, and (ii) a second thermal control signal responsive to the measured ambient temperature of the optical filter and the stored optical filter calibration information;
adjusting, using an emission source temperature control element, a temperature of the optical emission source responsive to the first thermal control signal; and
adjusting, using an optical filter temperature control element, a temperature of the optical filter responsive to the second thermal control signal.

17. The method of claim 16, wherein the emission source temperature control element is a heater element or a heat sink.

18. The method of claim 16, wherein the optical filter temperature control element is a heater element or a heat sink.

* * * * *